UNITED STATES PATENT OFFICE.

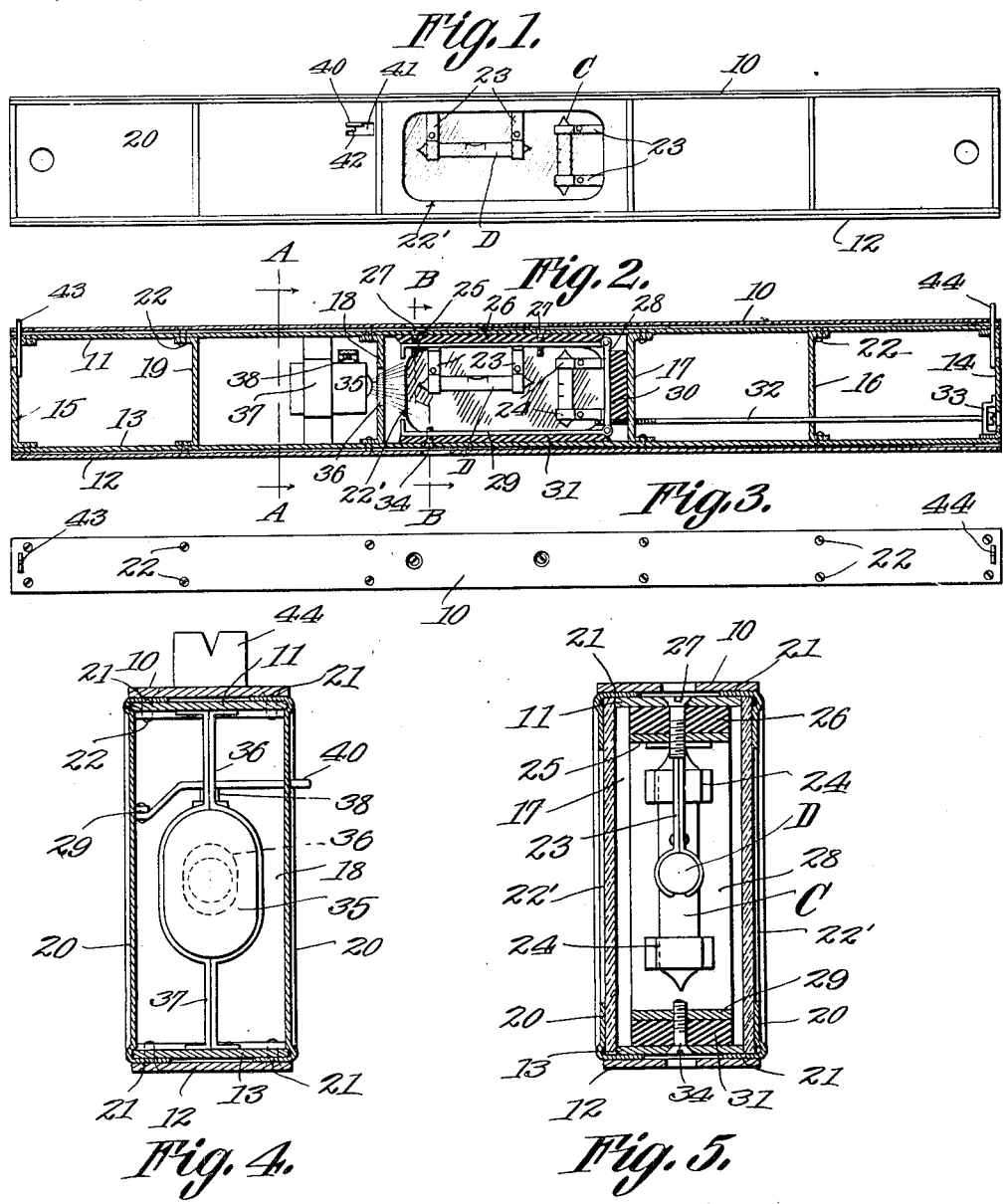

FREDERICK W. KALSOW, OF FORT DODGE, IOWA.

CARPENTER'S LEVEL.

1,085,342.     Specification of Letters Patent.     Patented Jan. 27, 1914.

Application filed November 9, 1912. Serial No. 730,476.

*To all whom it may concern:*

Be it known that I, FREDERICK W. KALSOW, a citizen of the United States, residing at Fort Dodge, in the county of Webster and State of Iowa, have invented a new and useful Carpenter's Level, of which the following is a specification.

This invention relates to a carpenter's or mason's level and more particularly to that class of levels in which an electric lamp is used to illuminate the leveling and plumbing vials.

An object is to design a level of the class designated in which the body of the level is made of steel or other suitable material. The plumbing and leveling vials will be readily visible from all sides of the level, and to provide a level having sights located at each end thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings forming a part of this specification—Figure 1 is a side view of my improved level. Fig. 2 is a sectional side view thereof. Fig. 3 is a top plan view thereof. Fig. 4 is a vertical sectional view on the line A—A of Fig. 2, and Fig. 5 is a vertical sectional view on the line B—B of Fig. 2.

Referring to the drawings in which similar reference numerals designate corresponding parts throughout the several views, the body of the level is formed of pressed steel and is composed of the top plates 10 and 11, the lower plates 12 and 13, the end pieces 14 and 15, the side members 20, and the transverse braces 16, 17, 18 and 19. The ribbed side members 20 are provided with the inwardly extending edges 21 which lie between and are held securely in place by the upper plates 10 and 11, and the lower plates 12 and 13. The various set screws 22 extend through the various plates and serve to hold the various members in place, thus insuring a rigid and substantial construction of the body of the level.

Centrally of the side member 20 is provided rectangular openings 22 in which space are placed glass panes. The leveling and plumbing vials D and C are positioned between these glass panes and are held to a frame by means of the supports 23 and 24. The leveling vial supports 23 are rigidly secured to the horizontal member 25 which member is spaced a distance from the plate 11 by means of the rubber washer 26. The adjusting screws 27 threadily engage this leveling plate 25 and are adapted to adjust the same. Hingedly connected to the member 25 is the vertically extending member 28 upon which is rigidly connected the supports 24 of the plumbing vial. Hingedly connected to the member 28 is the third member of this vial holding frame 29. The member 28 is spaced a distance from the brace member 17 by a rubber washer 30 and in order that this member 28 may be suitably adjusted it is provided with the adjusting screw 32 which extends longitudinally of the level and terminates a slight distance behind the member 14 where it is held by means of the member 33 as shown more clearly in Fig. 2. The member 29 is spaced a distance from the plate 13 by means of the rubber washer 31 and is held in spaced relation with said plate by means of the set screw 34, said set screw being adapted to move within a slotted opening. In order that the member 28 may be adjusted it is first necessary to loosen the screw 34 after which the rod 32 may be turned in order to adjust the plumbing vial C after which the set screw 34 is tightened to hold the vial in a locked position. Suitable holes are cut in the top and bottom plates 10 and 12 respectively in order that the set screws 27 and 34 may be accessible.

In order to illuminate the leveling and plumbing vials so that they may be visible from any angle and that the level may be used in dark places, the illuminating electric lamp 35 is positioned behind the brace member 18 which latter member has an opening 36 cut therein in order that the light of the electric lamp 35 may illuminate the various vials. The electric lamp 35 is supported by the members 36 and 37 which members are rigidly secured to the upper and lower plates 11 and 13 respectively. These members 36 and 37 rigidly hold the said lamp in spaced relation and insure that the latter will always remain in position so that its light will pass through the opening 36 in the member 18 as hereinbefore described. The electric lamp 35 is of the battery containing type and is provided with the push button 38 of the usual construction. In order that the push button may be actuated and held in a closed position, the member 40 suitably supported at 39 extends over and in contact with said push button 38. The member 40 extends outwardly through the side walls 20 which walls having a slot 41 therefor cut therein. This slot 41 is provided with the outstanding arm 42. The member 40 is adapted to be held positioned to keep the electric lamp lighted, by means of this arm 42.

At each end of the body of the level I have provided the sights 43 and 44 which are adapted to be lowered when not in use. By lowering these sights the desirable feature of having no outstanding projections or lugs extending from the body of the level is obtained.

It will thus be seen that I have provided a level having the desirable feature of the leveling and plumbing vials inclosed in the same compartment of the said compartment adapted to be illuminated by the electric lamp. The said leveling and plumbing vials supported by means of a hinged frame spaced a distance from the inner walls of the body of the level by means of rubber washers and held in spaced relation thereto by means of set screws. Furthermore I have provided means whereby the electric lamp may be retained in a lighted condition according to the will of the operator. The body of the level is of extremely strong construction and comparatively light in weight and being made of metal is practically indestructible. Furthermore by installing the sights at the ends of the level as more clearly shown in Fig. 2, a very accurate degree of leveling may be obtained and further by having these sights adapted to be lowered within the level body the surface of the level body will be continuous and the level therefore adapted to be carried about without fear of catching in the clothes of the user or be in the way during the non-use thereof.

Having thus fully disclosed the construction and outlined some of the advantages of my improved form of level, what I claim to be new and original with me is:—

1. In a level, a body, a compartment located therein and provided with glass side walls, a frame mounted within said compartment and held in spaced relation to said body by set screws, a resilient material disposed between said frame and said body, leveling and plumbing vials supported by said frame, means for adjusting the position of said frame to thereby adjust the said vials, and an electric lamp adapted to illuminate said compartment.

2. In a level, a body of press steel construction comprising two upper and two lower plates, suitable brace members extending between said upper and lower plates and rigidly secured thereto, side members having inwardly extending flanges fitting between said upper plates and between said lower plates, end members suitably secured to said side, upper and lower members, the central portion of said side members being provided with rectangular openings, said openings containing glass panes therein.

3. A frame for supporting leveling and plumbing vials comprising a horizontal member, a leveling vial supported thereby, a vertical member hingedly connected at one end to said horizontal member, a plumbing vial rigidly supported by said vertical member, a second horizontal member hingedly connected to said vertical member at its other end.

4. In a level, the combination of a pressed steel body, a central compartment provided with glass walls therein, plumbing and leveling vials supported by a frame adjustably mounted within said compartment, an electric lamp adapted to illuminate said compartment, a lever extending transversely of said body and adapted to contact with the electric lamp push button, said lever extending through a slot provided in the side walls, said slot having a lug projecting therein adapted to hold said lever in active engagement with said push button to thereby retain said electric lamp in a lighted condition.

5. In a carpenter's level the combination of, a body, a compartment provided with glass side walls located centrally of said body, a horizontal member spaced a distance away from the top of said compartment by means of set screws, a resilient material disposed between the top of said compartment and said horizontal member, a leveling vial supported by said horizontal member, a vertical member hingedly connected to said horizontal member and supporting a plumbing vial, a resilient material disposed between said vertical member and an end wall of said compartment, an adjusting screw engaging said vertical member, extending longitudinally of said level and terminating adjacent the end thereof, a second horizontal member hingedly connected to said vertical member at its lower end, a resilient material spaced between said second horizontal member and the lower wall, a set screw engaging said second horizontal member and adapted to hold the latter in a set condition, an electric lamp illuminating said compartment, and means for retaining said lamp in a lighted condition.

In testimony that I claim the foregoing as my own, I have hereto affixed my signature in the presence of two witnesses.

FREDERICK W. KALSOW.

Witnesses:
E. J. ARMSTRONG,
W. A. VAN HORN.